United States Patent [19]

Wheaton

[11] 4,181,209
[45] Jan. 1, 1980

[54] CLUTCH ASSEMBLY WITH WEAR COMPENSATION ADJUSTMENT

[75] Inventor: Robert F. Wheaton, Utica, Mich.

[73] Assignee: General Motors Corporation, Detroit, Mich.

[21] Appl. No.: 894,579

[22] Filed: Apr. 7, 1978

[51] Int. Cl.² ................................. F16D 13/75
[52] U.S. Cl. ........................ 192/111 A; 188/71.8
[58] Field of Search .............. 192/99 S, 111 A; 74/522; 188/196 R, 196 B, 196 P, 71.8, 79.5 GC, 79.5 K

[56] References Cited
U.S. PATENT DOCUMENTS

| 1,830,306 | 11/1931 | Wemp | 192/99 S |
|---|---|---|---|
| 3,621,959 | 11/1971 | Gale et al. | 192/111 A |
| 3,648,813 | 3/1972 | Walters et al. | 192/111 A |
| 3,768,612 | 10/1973 | Gale | 192/111 A |
| 4,068,750 | 1/1978 | Gatewood | 192/111 A |

FOREIGN PATENT DOCUMENTS 1411467 10/1975 United Kingdom ............... 192/111 A Primary Examiner—Rodney H. Bonck
Attorney, Agent, or Firm—Donald F. Scherer

[57] ABSTRACT

A clutch assembly and control having an automatic adjustment for friction lining wear and a lash control which essentially removes the forces on the clutch release bearing when the clutch is engaged. This is accomplished through a load sensitive releasable drive mechanism which provides the drive connection between the clutch pedal and the clutch cable during lash take-up in the system. The load sensitive releasable drive mechanism permits removal of forces on the clutch release bearing by allowing relative movement between the clutch pedal and the clutch cable if any forces are applied to the clutch release bearing while the clutch is engaged. During the lash take-up movement of the clutch, if the clutch release bearing forces are excessive, the load sensitive drive mechanism permits relative motion to lessen the bearing forces which are indicative of clutch wear.

2 Claims, 6 Drawing Figures

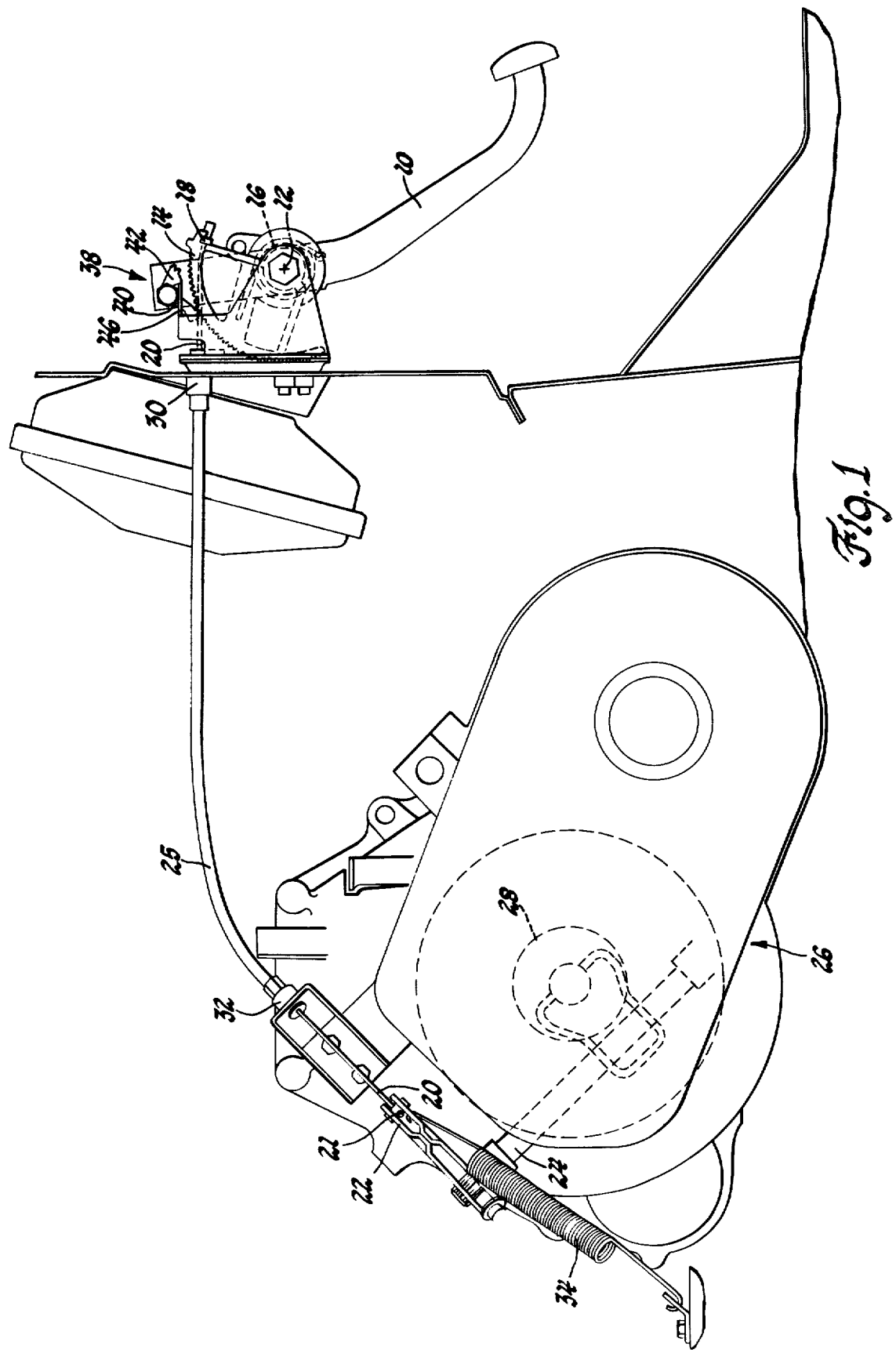

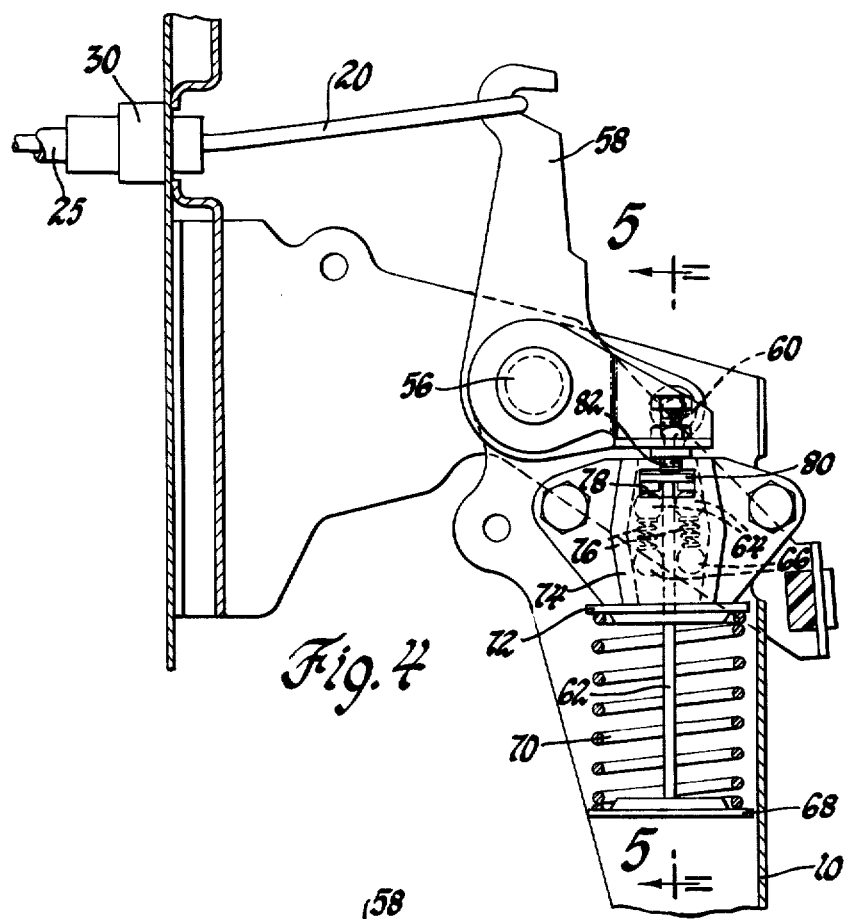
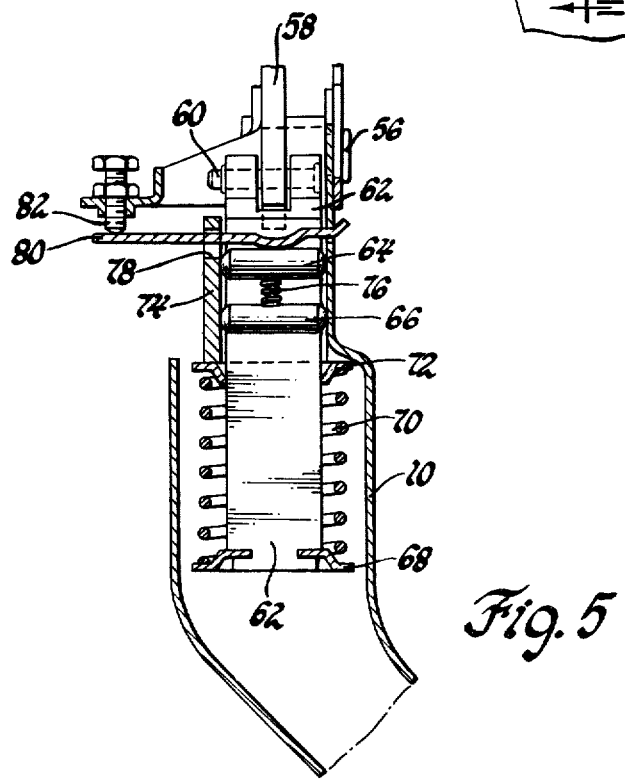

CLUTCH ASSEMBLY WITH WEAR COMPENSATION ADJUSTMENT

This invention relates to clutch assemblies and more particularly to clutch assemblies having an automatic wear adjustment and lash control mechanism.

It is an object of this invention to provide an improved clutch assembly wherein the forces on the clutch bearing are removed when the clutch is engaged.

It is another object of this invention to provide an improved clutch assembly having a wear compensating mechanism and a lash control mechanism permitting the clutch assembly to be self-compensating for clutch plate wear and for controlling the clutch spring load on the clutch release bearing when the clutch is engaged.

These and other objects and advantages of the present invention will be more apparent from the following description and drawings in which:

FIG. 1 is an elevational view of a clutch and control assembly;

FIG. 4 is another embodiment of the wear compensating and lash take-up mechanism; and FIG. 5 is a view taken along line 5—5 of FIG. 4.

Figure 2:
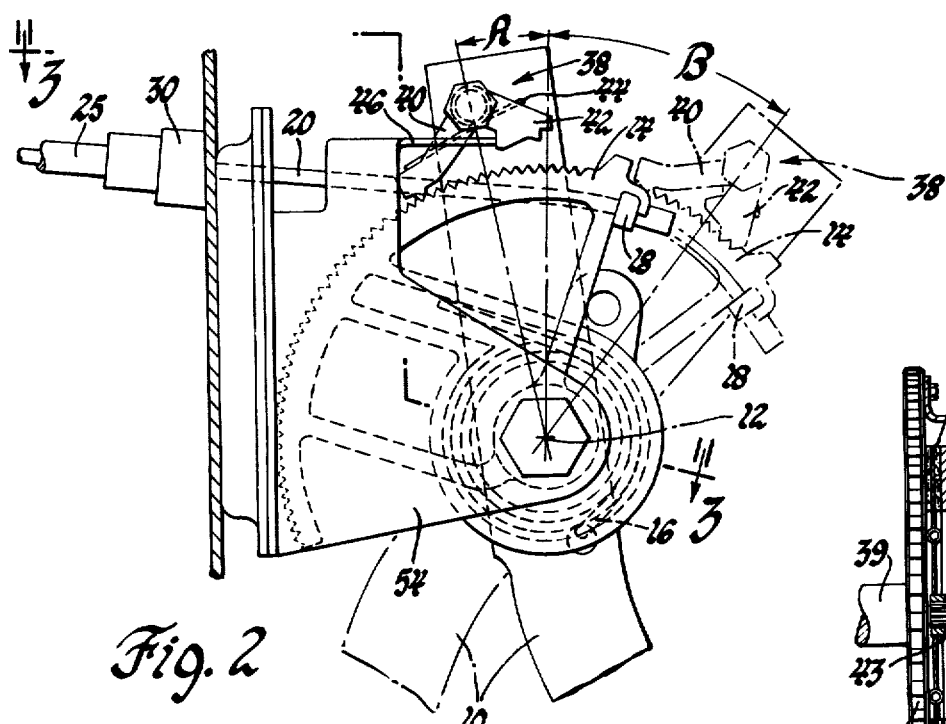
FIG. 2 is an enlarged view of a portion of FIG. 1 showing the wear compensating and lash control mechanism.

Referring to the drawings wherein like characters represent the same or corresponding parts that are seen in FIG. 1, a clutch pedal 10 is rotatably supported on an axis 12 which is secured to the vehicle body. The clutch pedal 10 is resiliently drivingly connected to a gear segment 14 through a torsion spring 16. The gear segment 14 is connected at 18 to one end of a control cable 20. The control cable 20 is a conventional type sheathed cable the other end 21 of which is connected to a lever 22, which lever 22 in turn is connected to a rock shaft 24 which operates a conventional manually controlled transmission input clutch generally designated 26. As is well known in conventional clutch arrangements, a release bearing, such as 28, is operated by the rock shaft 24 to control the spring load engaging the friction clutch between the engine and transmission.

The cable 20 has the outer sheath 25 secured to the vehicle body at 30 and 32 such that movement of end 18 results in movement of the lever 22 as long as the sheath remains stationary, as it is well-known in the art. The lever 22 is urged in the clutch engaging direction by a lash control tension spring 34, thus the end 21 of cable 20 connected thereto is also urged in the clutch engaging direction. The end 18 of cable 20 is urged in the clutch disengaging direction by the torsion spring 16 and the clutch pedal 10 is urged in the clutch engaging position by a tension spring 34 which may be considered a clutch pedal return spring.

Figure 1A:
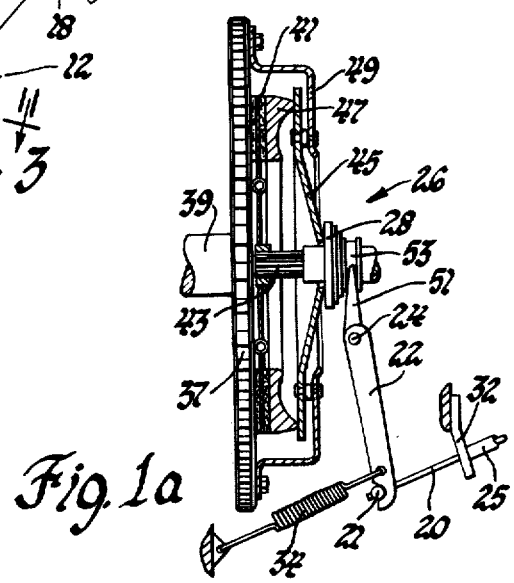
FIG. 1a is a diagrammatic showing a clutch assembly.

FIG. 1a diagrammatically shows the conventional clutch arrangement 26 in which a flywheel 37 is secured to an engine crankshaft 39. A friction plate or clutch disc 41 is splined to a clutch output shaft 43 which in turn is connected to a transmission, not shown, in a conventional manner. The clutch 26 is engaged by a conventional Belleville-type apply spring 45 acting through a pressure plate 47 driven by the flywheel 37 through a housing 49. The clutch 26 is disengaged through movement of the lever 22 and rock shaft 24 which moves the fork 51, disposed in a groove 53 formed in release bearing 28, to the left to engage and more the fingers of apply spring 45 and remove the engaging force from the pressure plate 47.

A wear compensating and lash take-up assembly 38 is rotatably mounted on the clutch pedal 10 and is best seen in FIG. 2. As can be seen in FIG. 2, the assembly 38 consists of a lash pawl or coupling member 40 and a compensating pawl or coupling member 42. Both coupling members 40, 42 are urged into engagement with the gear sector 14 by a torsion spring 44. In the clutch engaged position shown, the coupling 42 is held out of engagement with the gear sector 14 by a stop member 46 which is secured to the vehicle body. The clutch pedal 10 also contacts the stop member 46 in the engaged position shown in FIGS. 1 and 2. As shown in phantom lines in FIG. 2, when the clutch pedal is moved towards the disengaging position, the coupling 42 is removed from the stop member 46 such that the torsion spring 44 will enforce engagement between the gear sector 14 and the coupling 42. The coupling 40 is always urged into engagement with gear sector 14 by the torsion spring 44.

Figure 3:
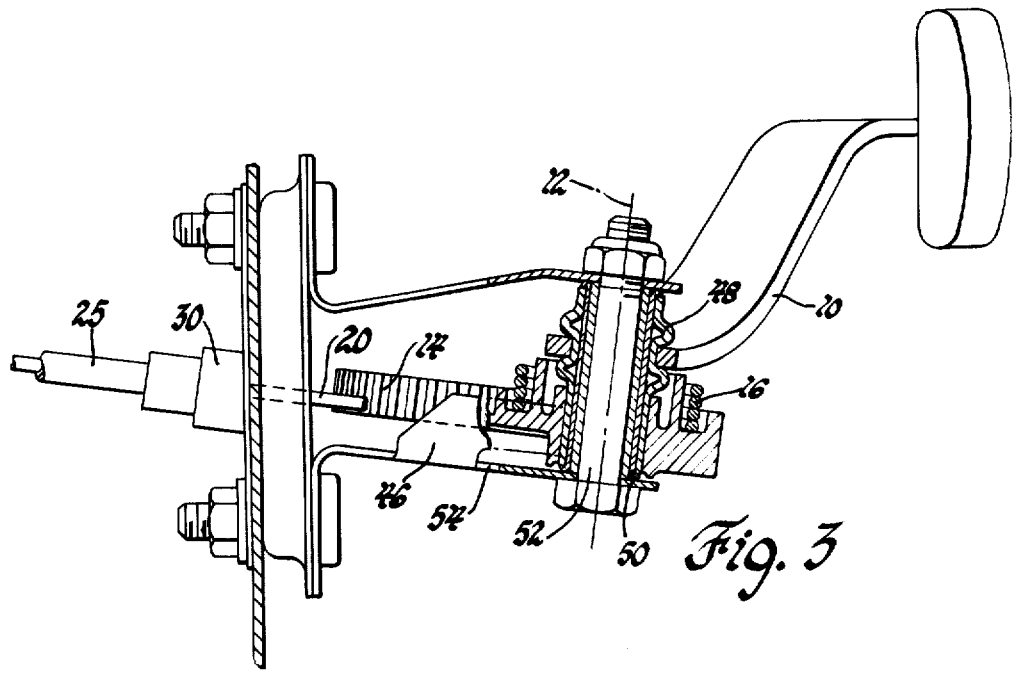
FIG. 3 is a view, partly in section, taken along line 3—3 of FIG. 2.

As can be seen in FIG. 3, the clutch pedal 10 is mounted on a tube member 48 which is rotatably supported on a bearing 50, which is mounted on a fastener 52 secured to a frame member 54 along axis 12. The gear sector 14 is rotatably supported on the tube 48 and is drivingly connected to the clutch pedal 10 by the torsion spring 16.

As shown in FIG. 1, the clutch pedal 10 and, therefore, the clutch 26 are biased to the engaged position by the return spring 34. The coupling 42 is engaged by the stop member 46 thereby placing the coupling 42 in a released position relative to the gear sector 14. The coupling 40 is locked into engagement with the gear segment 14 to prevent relative movement between the gear segment 14 and the clutch pedal 10 in a disengaging direction and to permit relative movement therebetween in the clutch engaging direction if the forces imposed on the cable 20 by spring 34 and the clutch apply spring forces on release bearing 28 are greater than the forces imposed on cable 20 by the torsion spring 16. If these forces are balanced, there will be no relative motion. The system is designed such that any release bearing forces which are present create an unbalance in the system which requires the gear sector 14 to rotate counterclockwise, as viewed in FIG. 2, and the coupling 40 will ratchet on the gear segment 14 during this relative movement. During movement of the clutch pedal 10, through the angle A, only the coupling 40 engages the gear segment 14. During travel through angle B, both couplings 40 and 42 engage the gear segment 14. Whenever coupling 40 alone is engaging the gear segment 14 relative movement in a counterclockwise direction by segment 14 will be permitted. This rotation of gear segment 14 relative to pedal 10 permits the clutch to compensate for any wear which has occurred during previous engaging and disengaging operations. When the clutch pedal 10 is moved from the disengaged position to the engaged position through angle B, there is no relative motion between sector 14 and the pedal 10 due to the engagement of coupling 42, and when the clutch pedal 10 is moved through the angle A, if the net spring forces are balanced, the gear sector 14 will continue to move with the clutch pedal 10 permitting the cable 20 to also move which will ensure some lash in the system and the alleviation of external forces on the clutch release bearing 28.

When the clutch pedal 10 is moved in a disengaging direction through angle A, the engaged coupling 40 ensures that the pedal 10 and gear segment 14 move as a unit to take up the lash and provide a light contact bearing force at a zero lash between the release bearing 28 and the clutch apply spring in clutch assembly 26, if the net force of torsion spring 16 and the force of spring 34 acting on the gear segment 14 are in proper balance. If wear has not occurred since the last clutch engagement, lash take-up will occur at the same release bearing position and segment 14 will not move relative to coupling 40 and the clutch pedal 10. If there has been wear on the clutch friction plate since the last clutch engagement, the apply spring in clutch assembly 26 will have a greater travel and the release bearing force will be at a higher value than the net spring force for proper balance during the lash take-up movement through angle A to cause the release of coupling 40 and permit rotation of gear segment 14 in an engaging or wear compensating direction relative to clutch pedal 10 to re-establish the bearing force at the desired level. As has been previously stated, during this lash take-up and wear compensating movement, stop member 46 holds the coupling 42 disengaged from the gear segment 14.

On further movement of clutch pedal 10 in the disengaging direction, the coupling 42 moves away from stop 46 and engages the gear segment 14 to move the gear segment 14, connecting cable 20, lever 22, rock shaft 24 and release bearing 28 as a unit with the clutch pedal 10 disengaging the clutch 26.

When the clutch pedal 10 is returned in the engaging direction, the coupling 42 remains engaged with gear segment 14 so that the clutch pedal 10 and gear segment 14 move as a unit through angle B. At the transition point, between angles A and B, stop 46 engages and releases the coupling 42.

If there has been sufficient wear so that there is an increase in the bearing force when the clutch pedal 10 reaches the transition point, the coupling 40 will be released from the gear segment 14 due to the excess load to permit relative movement of the gear segment until the desired balance of forces occurs, at which time compensation for the clutch wear has been made. Upon continued movement of clutch pedal 10 through angle A, the coupling 40 moves the gear segment 14 to provide lash between the apply spring in clutch assembly 26 and the release bearing 28.

The embodiment shown in FIGS. 4 and 5 includes a clutch pedal 10 which is pivotally supported on a member 56 secured to the vehicle housing. A lever or link 58 is also rotatably supported on the member 56 and has one end thereof connected to the cable 20. The other end of link 58 is connected by a pin 60 to an adjustor strip 62 which extends between a pair of wear compensating rollers 64 and a pair of lash rollers 66 to a spring seat 68. The spring seat 68 supports a coil spring 70 which is compressed between spring seat 68 and a spring seat 72 which is biased by the spring 70 against a cam housing 74, and in which cam housing 74 are disposed the rollers 64 and 66. As can be seen in FIG. 4, the cam housing 74 has sloping sides such that in the downward direction or clutch disengaging direction the rollers 66 are urged into engagement with the adjusting strip 62 and in the upward clutch engaging direction the rollers 64 are urged into engagement with the adjusting strip 62. The rollers 64 and 66 are urged in a separating direction by a pair of coil springs 76. The cam housing 74 is secured to the clutch pedal 10 and has formed therein a slot 78 through which extends an unloading lever 80 which is bifurcated at one end to pass by either side of the adjusting strip 62. The unloading lever 80 extends outside of the cam housing 74 to be abutted by a stop member 82 when the clutch is in the engaged position shown. The unloading member 80 abuts the rollers 64 to prevent their engagement with the adjusting strip 62. The stop member 82 is engaged when the clutch travels through the lash control angle A which is the same as that shown in FIG. 2. The unloading member 80 is out of abutment with the stop member 82 when the clutch pedal 10 is moved through the clutch control angle B. When the clutch pedal 10 is being moved through the clutch control angle B, the rollers 64 are forced into engagement with the adjusting strip 62 by the cam housing 74 such that unitary motion between the clutch pedal 10, lever 58 and cable 20 will occur. The cable 20 is, of course, connected to a conventional friction clutch assembly in a manner similar to that shown in FIG. 1. When the clutch pedal 10 is in engaged position under the bias of spring 34, the lash rollers 66 lock under the force of the adjustor spring 70 minus the force of the spring 34. At this time, there is lash between the clutch release bearing and the clutch apply spring. Initially depressing clutch pedal 10, there is no clutch release bearing force and then a low clutch release bearing force ensuring contact with the clutch apply spring occurs. The force in adjusting spring 70 is greater than and then equal to the sum of the force in spring 34 and the clutch release bearing force on the cable 20. Thus the lash rollers 66 remain locked to the cam housing 74. The lash is taken up and the clutch release bearing force increases to a low value when contact with the clutch apply spring occurs. Upon further rotation of the clutch pedal 10, the wear compensating rollers 64 are moved away from the unloading member 80 and are locked to the adjustor strip 62 by the cam housing 74. Further movement of the clutch pedal 10 in the disengaging direction, transmits the load to cam housing 74 and the adjusting strip 62 to the cable 20 to provide clutch disengagement.

When the clutch pedal 10 is moved to the engaged position, the unloading member 80 will engage the wear compensating rollers 64, when the clutch reaches the engaged position, that is after travel through angle B has occurred. This forces the wear compensator rollers 64 out of engagement with the cam housing 74 unlocking the adjustor strip 62 from the clutch pedal 10. The adjusting strip 62, link 58 and cable 20 are free to move in the engaging direction relative to the pedal if the load thereon is greater than the load on the adjusting spring 70. This condition will exist when the clutch disc has worn such that the clutch apply spring is engaging the clutch release bearing. The adjusting strip 62 will be moved relative to the pedal 10 since the lash control rollers 66 will permit movement in one direction, that is, toward clutch engagement. The wear adjustment occurs very quickly when the wear compensator rollers 64 engage the unloading member 80 so that, on continued movement of the clutch pedal 10, the cable 20 continues to move providing a lash condition in the clutch release bearing. This is caused by the lock feature of the lash rollers 66 to the adjusting strip 62 when the correct force balance occurs between the springs 70 and 34.

If no significant wear of the clutch friction material has occurred, the clutch apply spring height remains the same and the wear compensator rollers 64, lash rollers 66 and the spring forces maintain the same relative position between the clutch pedal 10 and link 58. Wear adjustment may normally occur during clutch engagement as described above but may also occur during clutch disengagement.

Obviously, many modifications and variations are possible in light of the above teaching. It is, therefore, to be understood that within the scope of the appended claims the invention may be practiced otherwise and as specifically described.

The embodiments of the invention in which an exclusive property or privilege is claimed are defined as follows:

1. In a clutch assembly; an input; an output; a support; clutch means having a backing plate and a pressure plate driven by said input; a driven disc, which wears with use, located between said backing plate and said pressure plate and drive connected to said output; clutch spring means mounted on and rotatable with said backing plate and biasing said pressure plate with a large clutch engaging force in an engaging direction and a release bearing having one and another relatively rotatable members, and during clutching movement said one member contacting and rotating with said clutch spring means to transmit load varying from a large disengaging load in disengaged position to a small normal contact load in no-lash engaged position and during lash movement separating said one member from said clutch spring means in a lash position; control means including linkage means including an operating lever pivotally mounted on said support; a cable operatively connected at one end to said another member and at the other end to said operating lever to transmit force and correspondingly position said operating lever and said release bearing; a manual lever pivotally mounted on said support and movable on the application of manual force from a lash engaged position through a lash distance to a no-lash engaged position and through a clutching distance to a disengaged position and on release of manual force return engaging direction movement always to the same positions; wear coupling means mounted on said operating lever and said manual lever biased to drive position for one-way drive by said manual lever only on disengaging movement and movable to a disconnect position; lash coupling means mounted on said operating lever and said manual lever biased to one-way drive position for drive by said manual lever only on engaging movement and to permit engaging movement of said operating lever relative to said manual lever; stop means on said support operative to stop said manual lever engaging movement at said lash engaged position; disconnect means on said support operative on said wear coupling means to disconnect said wear coupling means when said manual lever is in no-lash and lash engaged positions and therebetween; lever spring means connected between said manual lever and said operating lever for biasing said manual lever in said engaging direction with a return spring force to engage said stop means and biasing said operating lever with a disengaging spring force; lash spring means operatively connected between said support and said one end of said cable providing an engaging force opposing and less than said disengaging spring force by a predetermined small contact force balancing said normal contact load and said control means being operative, if no wear was occurred since the last operation in the no-lash position, on applying manual force overcoming said return spring force, said manual lever is moved in a disengaging direction from said lash position to said no-lash position with said wear coupling means placed in disconnect position by said disconnect means and said lash coupling means in drive position permits the same movement of said operating lever and said release bearing to take up lash and contact said clutch spring means with said contact load balancing said contact force at said no-lash position and from said no-lash position to disengaged position to place said wear coupling means in drive position for conjoint movement of said manual lever, operating lever, and release bearing by manual force balancing said clutch engaging force, and on releasing manual force on said manual lever, said clutch engaging force acts through said release bearing, said operating lever and said wear coupling means in drive position to move said manual lever and act with said return spring force on said manual lever to conjointly move said manual and operating levers to lash position where said contact force is balanced by and provides said contact load and said disconnect means disconnects said wear coupling means and with continuing engaging movement of said manual lever by said return spring force said lash coupling means in drive position drives said operating lever against said contact force to no-lash position where said manual lever engages said stop means, and when wear occurs since the prior engagement or disengagement, said contact load is larger than normal at said no-lash position, so with said wear coupling means in disconnect position, said lash coupling means permits engaging movement of said operating lever relative to said manual lever to reduce said larger contact load to said normal contact load balancing said contact force.

2. An improvement in a clutch assembly having a manual engagement and disengagement control and wherein a cable means transmits the control force from the manual control to the clutch release bearing which is subject to the clutch apply spring force and an engageable wear-compensating drive mechanism is disposed between the manual control and the cable means which is released during a portion of the manual control travel to permit adjustment in the clutch assembly to compensate for wear of the clutch plate, the improvement comprising a lash control mechanism for relieving the clutch apply spring force on the clutch release bearing including a load sensitive drive mechanism having drive means urged continuously into a driving connection between the manual control and the cable means and being disengageable during the portion of manual control travel when wear compensating drive mechanism is released to permit relative motion between the manual control and the cable means if the clutch apply spring force on the release bearing is above a predetermined value and being engaged during the said portion of manual control travel to ensure continued unitary movement of the cable means and manual control if the clutch apply spring force on the release bearing is equal to or less than the predetermined value to establish a lash condition between the release bearing and the clutch apply spring.

* * * * *